(12) United States Patent
Sykes et al.

(10) Patent No.: US 8,103,626 B2
(45) Date of Patent: *Jan. 24, 2012

(54) METHODS AND SYSTEMS FOR UPDATING WEB PAGES VIA A WEB DATA INSTANT UPDATE UTILITY

(75) Inventors: Roy Sykes, Redondo Beach, CA (US); Joseph Zusman, Sherman Oaks, CA (US); Sikun Lan, Los Angeles, CA (US); Kent Frazier, Los Angeles, CA (US); Tyler Young, Los Angeles, CA (US); Yong Huang, Los Angeles, CA (US); Stanislav Solari, Culver City, CA (US)

(73) Assignee: Citicorp Development Center, Inc., Blue Ash, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/683,470

(22) Filed: Jan. 7, 2010

(65) Prior Publication Data
US 2010/0114823 A1    May 6, 2010

Related U.S. Application Data

(63) Continuation of application No. 10/825,502, filed on Apr. 15, 2004, now Pat. No. 7,668,870.

(51) Int. Cl.
*G06F 7/00* (2006.01)
(52) U.S. Cl. ............................................. 707/610
(58) Field of Classification Search .............. 707/796, 707/610, 636, 608; 709/218, 229
See application file for complete search history.

(56) References Cited

U.S. PATENT DOCUMENTS

| | | | | |
|---|---|---|---|---|
| 6,105,028 | A * | 8/2000 | Sullivan et al. | 1/1 |
| 6,633,878 | B1 * | 10/2003 | Underwood | 1/1 |
| 6,810,423 | B1 * | 10/2004 | Gonno et al. | 709/229 |
| 7,100,195 | B1 * | 8/2006 | Underwood | 726/2 |
| 7,797,276 | B1 * | 9/2010 | Yang | 707/636 |
| 2002/0038357 | A1 * | 3/2002 | Haverstock et al. | 709/218 |
| 2002/0062157 | A1 * | 5/2002 | Sugimoto et al. | 700/14 |
| 2002/0091702 | A1 * | 7/2002 | Mullins | 707/100 |
| 2002/0091725 | A1 * | 7/2002 | Skok | 707/501.1 |
| 2002/0120757 | A1 | 8/2002 | Sutherland et al. | 709/229 |
| 2003/0023632 | A1 | 1/2003 | Ries et al. | 707/513 |
| 2004/0030697 | A1 | 2/2004 | Cochran et al. | 707/9 |
| 2004/0117358 | A1 * | 6/2004 | von Kaenel et al. | 707/3 |
| 2004/0172415 | A1 * | 9/2004 | Messina et al. | 707/104.1 |

* cited by examiner

*Primary Examiner* — Hung T Vy
(74) *Attorney, Agent, or Firm* — Johnson & Associates

(57) ABSTRACT

A method for updating web pages on a web server without republishing the web pages involves providing on a production database server a live version of one or more business data tables containing information used to populate web pages on a production web server and storing in a quality assurance database server a quality assurance version of the business data tables that can be used to populate pages on a quality assurance web server. A maker at a business workstation can access the quality assurance database server from time to time and enter a change to data on the quality assurance version of the business data tables. Thereafter a checker at the business workstation accesses the quality assurance database server to review and approve or reject the changes to the data on the quality assurance version of the business data tables, and if the checker approves the changes, the changes to the data on the quality assurance version of the business data tables are replicated from the quality assurance database server to the live version of the business data tables on the production database server.

14 Claims, 3 Drawing Sheets

METHODS AND SYSTEMS FOR UPDATING WEB PAGES VIA A WEB DATA INSTANT UPDATE UTILITY

PRIORITY APPLICATION

This application is a continuation of U.S. patent application Ser. No. 10/825,502 filed Apr. 15, 2004, now U.S. Pat. No. 7,668,870 entitled "METHODS AND SYSTEMS FOR UPDATING WEB PAGES VIA A WEB DATA INSTANT UPDATE UTILITY" which is incorporated herein by this reference.

FIELD OF THE INVENTION

The present invention relates generally to the field of data management, and more particularly to methods and systems for updating web pages on a website via a web data instant update utility.

BACKGROUND OF THE INVENTION

Typically, web publications are accomplished by taking HTML files and their graphics, etc. and moving them from a development Web server to a quality assurance Web server to a production Web server. That is also the usual way in which most websites are updated. Multiple production web servers are generally employed in a web server environment for continuity of business and high availability. For example, a particular entity may employ ten production web servers in two different sites, i.e., five web servers in each of two sites. In such an environment, the concept of moving files around and publishing projects can become problematic, for example, if network communications are interrupted, if a particular machine fails, or if problems arise in replicating data from one machine to another machine.

Those types of problems are reasonably solvable as long as the volume of changes being performed is relatively low, such as updating the website ten times a day. However, such problems are quite difficult to solve if the website must be updated, for example, many times a day, and certain types of information published on a website, such as currency exchange rates and interest rates, change at least daily and may change several times in the same day. Thus, there is a present need for a method and system for updating web pages on a website frequently without moving files into the web server.

SUMMARY OF THE INVENTION

It is a feature and advantage of the present invention to provide a method and system for updating web pages on a website utilizing a number of different user roles including, for example, a maker role for changing data to be displayed on a web page and a checker role for approving such changes.

It is a further feature and advantage of the present invention to provide a method and system for updating web pages on a website that enables makers and checkers to view changed data using the appropriate web page on development and quality assurance web servers before the changes are approved for use on live web pages on production web servers.

It is another feature and advantage of the present invention to provide a method and system for updating web pages on a website that enables a maker to designate the time that a change will take effect after checker approval.

It is an additional feature and advantage of the present invention to provide a method and system for updating web pages on a website that enables makers to create new business data tables and make table data changes via web browsers.

It is a still further feature and advantage of the present invention to provide a method and system for updating web pages on a website that affords the ability to track all changes.

It is still another feature and advantage of the present invention to provide a method and system for updating web pages on a website that allows secure and continuous connection between web servers and database servers that host the data.

To achieve the stated and other features, advantages and objects, an embodiment of the present invention provides a method and system for updating web pages on a website via a web data instant update application that gives businesses a tool for easily updating time critical data, such as news, interest and mortgage rates, on their web sites without having to republish their web sites, as is currently the common practice. The time critical data resides on a web data instant update database server and is accessed via a maker/checker change control procedure using a web browser. A maker updates the data and specifies a date and time that the updates will take effect in production. A checker reviews, approves, or rejects the updates, and if the checker approves the updates, the new data takes effect on the business' web site at the date and time specified by the maker.

Embodiments of the invention enable web pages on a web server to be updated without republishing the web pages, which involves, for example, providing on a production database server a live version of one or more business data tables containing information used to populate web pages on a production web server accessible via a browser on a customer workstation. In addition, a quality assurance version of the business data tables is stored in a quality assurance database server that can be used to populate pages on a quality assurance web server accessible via a browser on a business workstation. The database hosted on each of the database servers is an SQL database, and the respective versions of the business data tables can consist of either a text data table or a binary data table.

From time to time, a maker at the business workstation accesses the quality assurance database server via a backend database management application and enters one or more changes to data on the quality assurance version of the business data table using a browser on a business workstation and can also designate a time for the change to be accessible on the production web server. Changes which the maker can make to the data on the quality assurance version of the business data tables include, for example, adding a business data table, deleting the business data table, adding one or more rows to the business data table, deleting one or more rows of the business data table, adding one or more columns to the business data table, deleting one or more columns of the business data table, modifying content of one or more rows of the business data table, and/or modifying content of one or more columns of the business data table.

Thereafter, a checker at a business workstation accesses the quality assurance database server via the backend database management application to review and approve or reject the changes to the data on the quality assurance version of the business data tables using the web browser on a business workstation. It is to be noted that makers and checkers can use the same or a different business workstation and that multiple business workstations can be located anywhere throughout the world. In reviewing the changes, the checker can display a web page populated by the business data tables in which the data is changed at the checker's workstation via the quality assurance web server. If the checker approves the changes, the changes to the data on the quality assurance version of the business data tables are replicated from the quality assurance database server to the live version of the business data tables on the production database server at the time designated by the maker. The components are coupled to one another, for example, via a global network, such as the Internet, or via an intranet.

Additional objects, advantages and novel features of the invention will be set forth in part in the description which follows, and in part will become more apparent to those skilled in the art upon examination of the following, or may be learned from practice of the invention.

DETAILED DESCRIPTION

Figure 1:
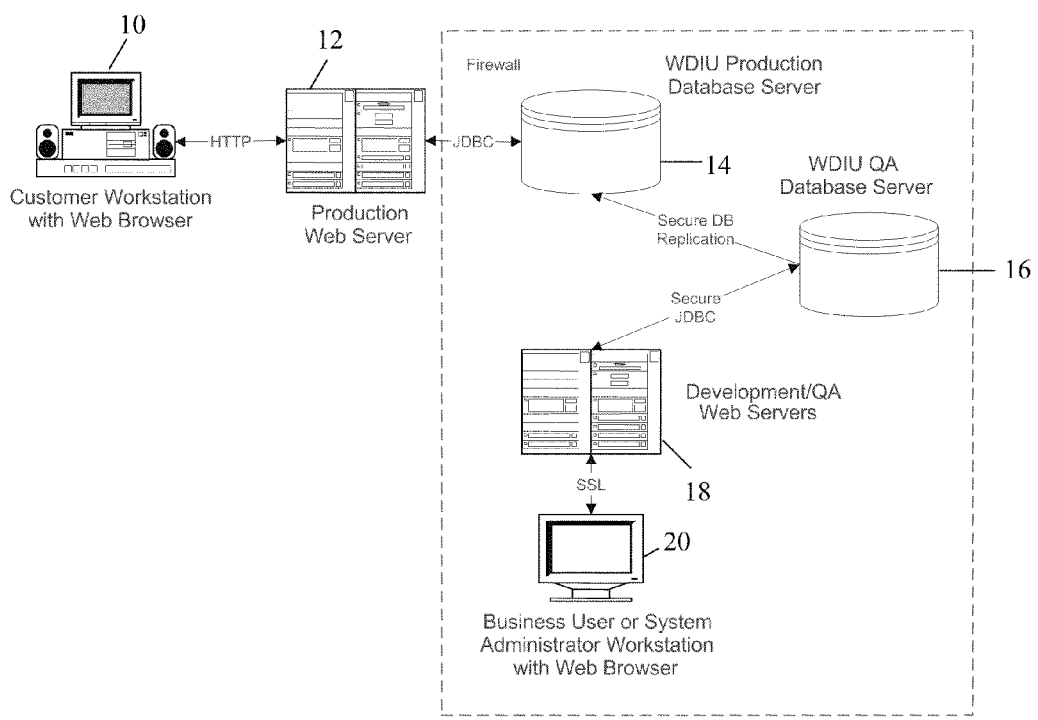
FIG. 1 is a schematic diagram that illustrates an overview of an example of key components and the flow of information between the key components for the method and system for updating web data for an embodiment of the invention.

Referring now in detail to an embodiment of the invention, an example of which is illustrated in the accompanying drawings, the present invention provides a method and system for frequently updating web pages on a website via a web data instant update ("WDIU") utility. The WDIU utility for an embodiment of the invention comprises multiple components. One such component, referred to as the data management capability, allows users to manage the data itself, which is stored in a database, such as an ORACLE database. Another component, referred to as the data access capability, allows users to retrieve that data and include it in the users' web pages.

The data access capability of the WDIU utility for embodiments of the invention is used by website developers to build web pages that can pull in data from the ORACLE database. As a result, an embodiment of the invention provides the capability to change the ORACLE database and then automatically have those changes appear on the website without having to move any files around. That is true because the web pages on the website dynamically access the ORACLE database by going through a firewall and accessing the ORACLE database inside the firewall. The data access capability of the WDIU utility is implemented, for example, using JAVA Server Pages, a technology available from JAVA. This technology, for example, allows a user to create an HTML page that also has JAVA calls or JAVA code in it. An embodiment of the invention involves the creation of a set of custom tags, which is a technical term for JAVA call-outs that allow the user to call out to a JAVA subroutine. The JAVA subroutine then goes and gets the data off a specific database on a specific table or a specific row or cell within a table in a particular row. The foregoing infrastructure for embodiments of the invention is used by developers to build web pages on a website that can dynamically access the ORACLE database to retrieve data and update the website.

The data management portion of the WDIU utility for embodiments of the invention provides the capability to set up separate tables for each business unit. In terminology associated with SQL databases, a table is basically a spreadsheet. In other words, it is a set of rows and columns with cells, and each cell within a table has a particular meaning. Basically, each business unit of an entity, which can be, for example, a portion, an independent organization, or a subsidiary of the entity, such as a financial institution, is allowed to utilize the data management portion of the WDIU utility, for example, for a service fee. The data management capability allows each business unit to have its own table or set of tables on the database. It also allows each business unit to update those tables any time throughout the day without intervention by anyone else.

A key aspect of the updating capability for embodiments of the invention involves a maker/checker process that is built into the data management function. The maker/checker process requires, for example, that two people are involved in updating any table. This is a precautionary measure implemented to satisfy audit requirements that prohibit one person from making a change to a website without another person approving the change in order, for example, to avoid inclusion of undesirable content on the website by a disgruntled employee. The maker/checker process allows one person to log on to the WDIU data management function and make the changes they desire to make. Those changes, however, are not put into production immediately, but instead are temporarily stored in a quality assurance ("QA") server. Thereafter, a second person logs on to the WDIU data management function and reviews those changes to confirm that they are acceptable changes. Another key aspect of the WDIU data management function for embodiments of the invention is a built-in ability for the checker to actually see how changes in the tables will appear in web pages that will display the particular data. The data is provided to the checker in such a way that the checker can easily tell what has been changed in the table. After the checker approves the change, the change is taken from the QA web server and replicated out to the database on the production systems.

In embodiments of the invention, the data is actually replicated to two or more different databases in keeping with continuity of business requirements to have two or more ORACLE production databases. The movement of data between the QA database and the production database is done with database replication techniques supported, for example, by ORACLE. The replication strategy for embodiments of the invention is much less problematic than moving around numerous files according to existing art processes. A key feature of embodiments of the invention is the capability to have data and a database that can be edited in such a manner that it is not immediately applied but goes through the maker/checker work flow process. The present invention employs a work flow process in which the maker makes the change and the checker then must approve the change, which was not previously available in any commercially available software. The data management tool of the WDIU utility for embodiments of the invention allows a user, for example, to look at a table, add rows to the table, add columns to the table, change individual data items within the table, delete rows from the table, and/or delete columns from the table.

Essentially, a user can edit and change the whole structure of an SQL database table as part of the data management activity according to embodiments of the invention, a capability which likewise was not previously available. The data management capability of the present invention enables database table editing in a way that is analogous to document editing by a word processor, such as MICROSOFT Word, and is a powerful database editor that will edit any type of SQL database table on an ORACLE system.

For large volume updates, for example, changing web pages multiple times throughout the day, problems arise in existing art processes due to the necessity of moving a large number of files around in the operating system. For example, moving large numbers of files around in the existing art processes, can result in files not being totally transferred from one system to another and files not being properly installed. Those problems do not arise with embodiments of the present invention where the database is in place and the only changes are to data on the database. An existing art method of updating web pages is a content management system that moves files from development to QA to production servers, while the WDIU utility process for embodiments of the invention is the infrastructure component that moves database changes from to QA to production servers.

The WDIU system for embodiments of the invention provides businesses with a tool for an easy update of time critical data, such as news, interest rates, and mortgage rates, on their web site without having to republish their web site using a content management system that moves files from development to QA to production servers, which is currently the common practice. The WDIU system allows business units to maintain and dynamically retrieve data in ASCII text format as well as binary files. Binary files support includes .pdf, .doc, .xls, .pps, and .ppt file types. The time critical data resides on a WDIU QA database server and is accessed via a maker/checker change control procedure using a web browser. The maker updates the data and specifies the date and time that the updates will take effect in production. The checker reviews, approves, or rejects the updates. If the checker approves the updates, the new data will be placed into a WDIU production database server at the time specified by the maker. Once in productions, the new data is immediately accessible by the customers.

The WDIU application for embodiments of the invention includes a number of different business user roles. Such roles include, for example, the maker for changing the data to be displayed on a web page, the checker for approving the change, a business administrator for managing business users for a business, such as adding and deleting users, resetting users' passwords, and changing users' roles, and an reader for monitoring all the changes and system access. The system administrator role establishes businesses and performs system maintenance on the WDIU server for an embodiment of the invention and all business administrator functions.

In addition, the maker creates or deletes business data tables and adds or deletes table columns and rows and updates the text or binary data on the web pages using a web browser or by importing text data into text data tables from a properly formatted Excel spreadsheet. Changes made by a maker are visible on the live web site only after a checker has approved the changes, and makers can also designate the time that the change will take affect after checker approval. The checker role reviews the changes and approves or rejects the changes using a web browser, and makers and checkers can view the changed data using the appropriate web pages on the development and QA web servers as part of their development and approval process. System administrators establish new businesses and add an initial administrator for each business.

Embodiments of the invention provide the ability to track all changes and system access, to allow all time values used in databases to be a business' local time, and to allow web pages (JSPs) on UNIX and Windows NT web servers access to the data managed by the WDIU application. Further, embodiments of the invention provide secure connection between the web browsers and the web servers that host the WDIU application and between the web servers and the WDIU database servers that host the data, provide a 24×7 connection between the web servers and the WDIU database servers, and allow data on the WDIU database servers to be retrieved by the web servers with high efficiency.

The WDIU application for embodiments of the invention employs a set of system components that consist of both hardware and software. FIG. 1 is a schematic diagram that illustrates an overview of an example of key components and the flow of information between the key components for the method and system for updating web data for an embodiment of the invention. The system components shown in FIG. 1 are connected via the Internet or via an intranet. Referring to FIG. 1, components of the WDIU system for embodiments of the invention include, for example, a customer workstation 10 with a web browser, which is used by customers to display web pages, and a production web server 12, which hosts the business' web pages that contain web data stored in a WDIU database server 14. The database server 14 hosts WDIU system tables and business data tables. Other components of the WDIU system for embodiments of the invention include, for example, a WDIU QA database server 16, one or more development/QA web servers 18 that host applications for business web users, such as makers, checkers, and a business user's workstation 20 with a web browser that is used by business users to create, update, and review business data tables in the WDIU database server 14, and to manage business configurations and business users, and view logs.

Referring further to FIG. 1, the maker accesses the WDIU QA database server 16 via a WDIU database management application on the development/QA web servers 18, using a web browser. The maker can review and change the data in the business tables. The maker can also designate the time that the changes will be effective and therefore, available for use by a web page on the production web servers 12. The checker accesses the WDIU QA database server 16 via the WDIU database management application on the QA web server, using a web browser. The checker can review all changes made by a maker and can approve or reject the changes. If the checker approves the changes, the modified data is moved to the WDIU production database servers 14 and will become available to the production web servers 12 after the time designated by the maker. A customer accesses web pages using a web browser on the customer's workstation 10. The pages are generated either by servlets or JSP pages. When the web server 12 receives the request from the customer, the web server 12 passes control to a JAVA Servlet engine, for example, JRUN to process the servlet or JSP. The JAVA servlet or JSP then accesses the WDIU database server 14 using a JDBC driver. The result of the servlet or JSP process is returned to the production web server 12. The production web server 12 then sends the result to the browser on the customer's workstation 10.

In order to use the WDIU system for an embodiment of the invention, a web browser is started. Once the web browser is active, the WDIU application is accessed by entering the WDIU system URL in a location box of the web browser and then pressing the 'Enter' key. In response, a logon page is displayed requesting a user name and password. A valid user ID and password are required to logon into WDIU utility. In order to ensure that there is at least one administrator per business, the system administrator sets up the user ID and password for the first business' administrator and the business administrator can subsequently set up all additional business' users. Once a user logs into the WDIU system, the user's web browser is enabled to perform WDIU functions until the user logs out or the web browser is terminated.

In an embodiment of the invention, after logging on to the WDIU system is completed, a main screen is displayed which is segmented into a navigation frame and a main frame. In the upper portion, the navigation frame displays the User ID, the role of the current user, and the business name, and the rest of the navigation frame displays links that invoke various WDIU functions, including 'About WDIU' and 'Logout' links. The links displayed in this frame are dependent on the access privileges of the user, and there are distinct sets of links for maker, checker, system administrator, business administrator, and reader. The main frame displays the information associated with the function that is being performed. For example, if the user clicks on a 'List Tables' link, the 'List Tables' related window appears in the main frame. When first logging in, the list of tables currently defined for the user's business is displayed in the main frame.

According to embodiments of the invention, the navigation frame for system administrator also contains a pull-down list of businesses, and by selecting one of the businesses in the pull-down list, the system administrator is enabled to perform functions on behalf of that business. Information displayed on the screen can be printed by clicking on the web browser's 'Print' icon. Since the WDIU screen is segmented into frames, only the active frame is printed, when the 'Print' icon is clicked. A frame is made active by moving the mouse pointer inside the frame and clicking the left mouse button. When a frame is made active, the border of the frame that was active and the border of the frame that is being made active changes.

In the WDIU system for embodiments of the invention, a business workstation 20 is, for example, a standard PC with a Netscape 4.0 or above browser or a Microsoft Internet Explorer 5.0 or above browser and is typically provided by the business. The development, QA, and production web servers 12, 18 all run, for example, Netscape's iPlanet web Server Enterprise Edition under Sun Solaris. The Netscape iPlanet web Server Enterprise Edition provides access to both non-secure (HTTP) and secure (HTTPS, also known as SSL) documents on all these servers. Secure Sockets Layer (SSL) is provided via Server Gated Cryptography, which allows 128-bit SSL to be used with numerous browsers, including both U.S. domestic and non-domestic browsers.

The web servers 12, 18 for embodiments of the invention contain various software components to support the WDIU application including, for example, a JAVA Servlet Engine, a JDBC driver, an XML JAVA Package, WDIU front-end database access JSP custom tags, a WDIU backend database management application, and JSP files. The JAVA Servlet Engine is a program used to run a J2EE compliant JAVA Servlet and JSP to dynamically generate a web page on a web server 12, 18 by accessing data from the WDIU ORACLE database. The Micromedia's JRUN Application Server provides this program. The JDBC driver is used by servlets to establish a connection between the web servers 12, 18 and the WDIU database servers 14, 16. There are two parts of a JDBC driver, namely, the web server component, which resides on the web servers 12, 18 and the database component, which resides on the database servers 14, 16. This program is provided by ORACLE's Thin Client Driver.

The XML JAVA Package is used by servlets to extract data from an XML file generated from a database query response. This program is provided by the ORACLE's JAVA XML Parser and XML SQL Utility. WDIU front-end database access JSP custom tags are created for use by business developers to invoke from their JSP files. The WDIU backend database management application is created for use by business users to add, modify and delete data from database. The JSP files are used to access the data in the WDIU database servers 14 and construct resulting HTML files for the web browser. The JSP files are created for use when a customer accesses a web page that requires data residing in the database. The JSP files invoke the above custom JSP tags. A WDIU database server 14 hosts the WDIU database. To assure 24×7 availability, primary and secondary QA and Production WDIU database servers 14, 16 are deployed. In the event the primary WDIU database server is not available, the production web servers 12 connect to the secondary WDIU database server until such time as the primary WDIU database server becomes available.

Figure 2:
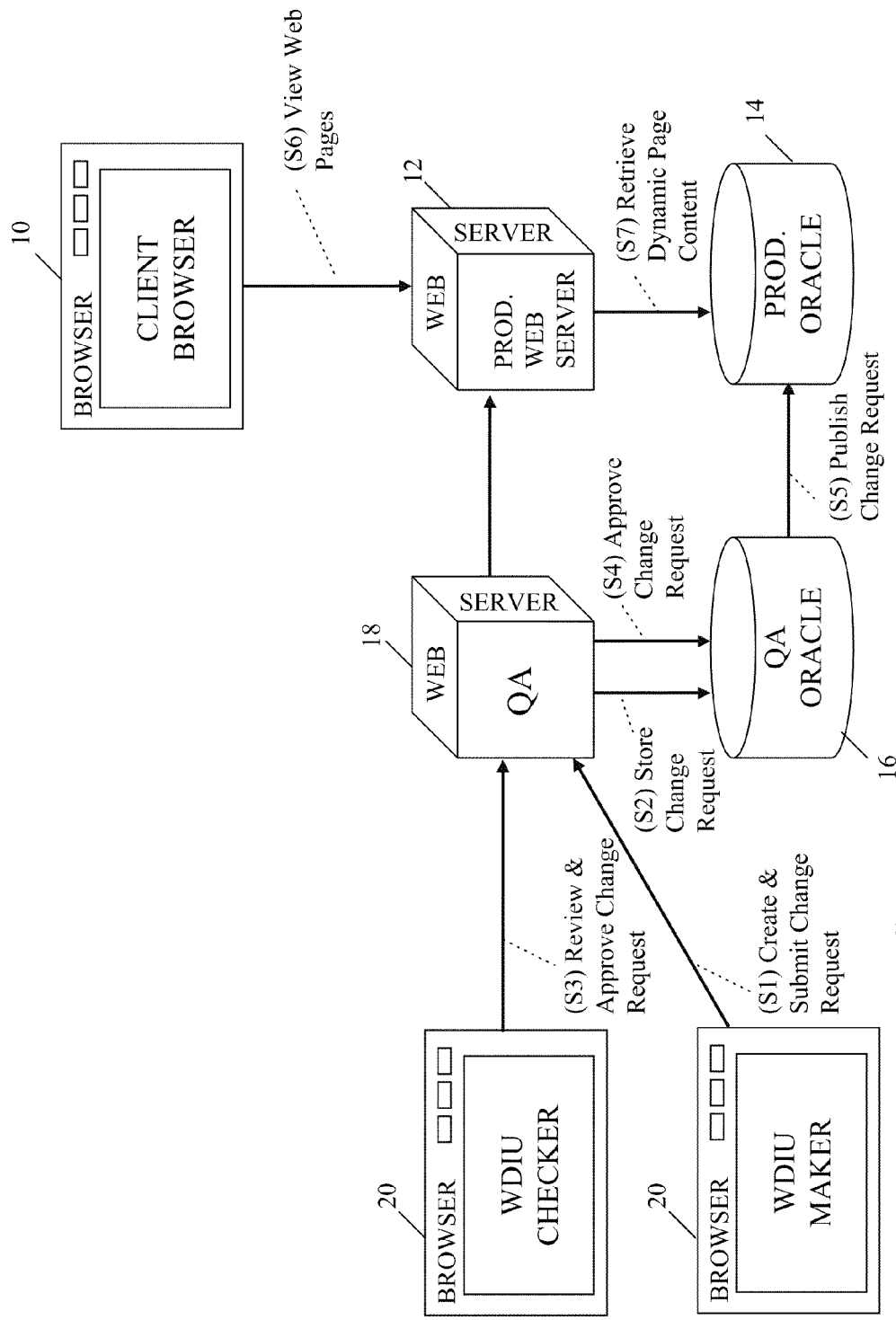
FIG. 2 is a schematic flow chart that illustrates an example of the process of updating web data according to the WDIU method and system for an embodiment of the invention.

FIG. 2 is a schematic flow chart that illustrates an example of the process of updating web data according to the WDIU method and system for an embodiment of the invention. Once a business and initial business administrator are set up in the WDIU QA database, the business administrator can add new business users or delete and modify existing business' users. Referring to FIG. 2, at S1, the maker accesses the WDIU QA database server 16 via a WDIU backend database management application on the development web server 18, using the web browser on the business user's workstation 20, makes changes to the data in the business data tables, submits a change request, and at S2, the change request is stored on the QA database.

Referring further to FIG. 2, at S3, the checker accesses the QA database server 16 via the backend database management application on the development/QA web server 18, using the web browser on the business user's workstation 20 and reviews the change requests. The checker can approve or reject the change requests, and if the checker approves the changes, the modified data is available to the production web server 12 after the time designated by the maker. At S4, the approval of the change request is stored on the QA database server 16, and at S5, the change request is published on the production database 14. At S6, a customer accesses web pages using the web browser of the customer's workstation 10. At S7, the pages are generated by either servlets or JSP page, which are executed and the result returned to the web server 12. The web server 12 then sends the result to the browser of the customer's workstation 10. Thus, customers are able to access time critical data from the WDIU production database servers 14, and business users are able to access and manage the business account, user accounts, and time critical data on the WDIU QA database servers 16.

Changes to the data in the WDIU business tables for embodiments of the invention include, for example, adding/deleting business tables, adding and deleting rows and columns, modifying the content of rows and columns, importing or exporting table data, modifying table descriptions and web Page URL lists, and saving, canceling, withdrawing, approving, and rejecting change requests. A change request is used to manage the WDIU business tables and is an aggregate of all changes made to a business table by one or more users from the time the change request is created until the time the change request is approved by a checker or canceled by a maker. At any time, only one change request can exist for a given business table.

In an embodiment of the invention, a change request is created by a maker's actions, for example, when creating a new business table by performing a 'Create Table' function or by selecting a 'New Change' button for an existing business table from a 'List Tables' screen or a 'View Table' screen. A change request can be either saved, submitted, approved, or completed during any given time in its life cycle. A saved change request is a change request that is still in the process of being edited by a maker; a submitted change request is ready to be reviewed by a checker; an approved change request has been reviewed and approved by a checker and is awaiting promotion to production; and a completed change request has been promoted to production and reflects the final step in a change request's life cycle.

The WDIU QA database for embodiments of the invention holds all system and business data tables used by the WDIU application, and the WDIU production database holds only the business data tables. System tables include, for example, a BUSINESS_INFO table that contains the business information for each business that uses the WDIU application and which is maintained by WDIU system administrators and a USER_INFO table that contains user information for all WDIU users and which is maintained by Business Administrators. Other system tables include, for example, a TABLE_INFO table that contains control information for each business data table in the database, a CR_INFO table that contains information for change requests of business data tables in the database, a PUBLISH_SCHED table that lists approved change requests of the business data tables that are pending publishing to the production database servers.

In addition, business data tables for embodiments of the invention contain business information that is used to populate web pages on the development, QA, and production web servers 12, 18. A business maker creates the business data tables in the QA Database server 16. When the maker creates a business data table, the WDIU backend application creates two versions of the table, namely, a production version and a QA version, in the QA database server 16. The production version contains the "live" data, i.e., data that is used by the production web server 12. The QA version is used to make and approve changes to the "live" data in the production version of the table. When a maker modifies a table or updates the data in a table, the changes are first reflected in the QA version of the table. When a checker approves the changes to a table, the changes are then moved from the QA version to the production version of the table at the time specified by the maker. Subsequently, the changes to the production version of the business data table are replicated from the QA Database server 16 to the production database servers 14.

Figure 3:
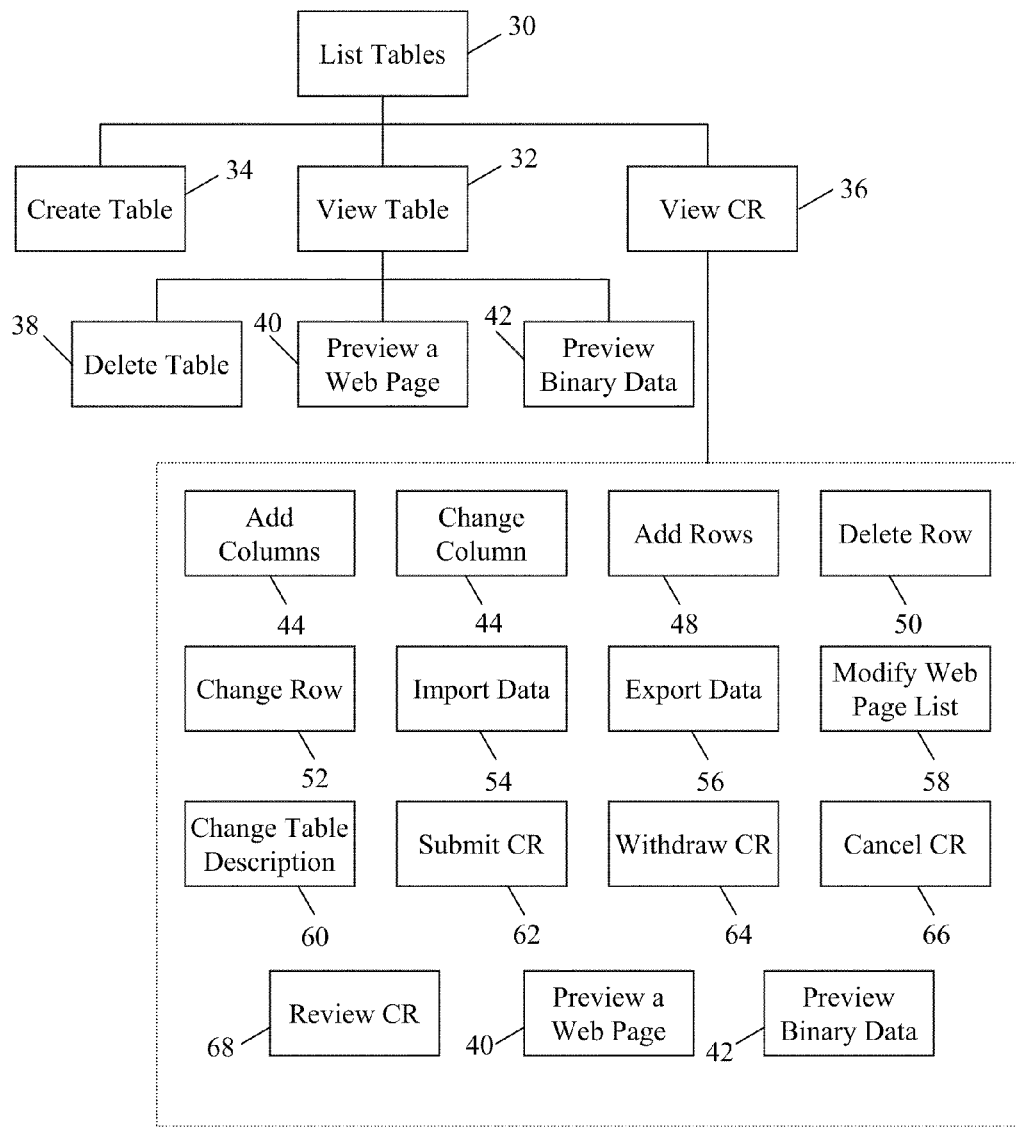
FIG. 3 is a schematic page flow diagram that illustrates an example of a user's functional responsibilities as it relates to managing the WDIU business tables for embodiments of the invention.

FIG. 3 is a schematic page flow diagram that illustrates an example of the WDIU user's functional responsibilities as it relates to managing the WDIU business tables for embodiments of the invention. Referring to FIG. 3, a 'List Tables' function 30 of the WDIU utility for an embodiment of the invention is used to display a list of business tables and is displayed by clicking on a 'List Tables' link in the navigation frame. Each table name is hyperlinked to 'View Table' 32 which displays detailed business table information. In addition, hyperlinks are available to view current and historical change requests. If no current change requests are present, a 'New Change' button is provided to create a new change request. The 'List Tables' function 30 also provides an 'Add Table' button to create a table, which can be used to create a new business table. The 'View Table' function 32 is used to view detailed business table information and open new or existing change requests for the table. 'View Table' 32 is displayed by clicking on the desired 'Table Name' hyperlink in 'List Tables' 30 and also provides a button to 'Delete Table,' which can be used to delete the currently viewed business table if all change requests are completed. Additionally, a list of change requests associated with the current table is displayed. The user may select individual change requests to see what changes have been made to the table over time.

Referring further to FIG. 3, a 'Create Table' function 34 is used to add a new business table. A business table consists of the name of the table (Table Name), a description of the data found in the table (Table Description), specification of the table data type (Table Type), and the beginning date on which the table is used in production (Production Date). Two types of tables can be created, namely, text data table and binary data table. Makers can create new columns and add new rows to a text data table. When creating a table, no new columns are added. New columns are added by using an 'Add Columns' function 44 and can be of either "short string" or "long string" types. Each cell in a short string column can hold up to 200 bytes of text data, and each cell in a long string column can hold up to 4,000 bytes of text data. Because UTF-8 encoding is used for text data in the database, most Western languages use 1 byte to hold one character, some languages (for example, Greek, Arabic, Hebrew, and Russian) may use 2 bytes to hold one character, and some languages (for example, Chinese, Japanese, and Korean) may use 3 bytes to hold one character.

Makers can create new rows to a binary data table. The columns in the binary data tables are fixed and contain the information, such as ROW_ID (a sequential number starting from 1), FILE (binary data file and its size), HYPERTEXT (the link hypertext that the browser user can click to display binary data), DESC1 (the short description of the binary data (up to 200 bytes)), DESC2 (the long description of the binary data (up to 4,000 bytes)), LASTMODIFIED (the time that the binary data file is last modified), and LASTPUBLISHED (the time that the binary data file is last published to the Production Database). After selecting the 'Add Table' button in 'List Tables' 30, an 'Add a New Table Request' form is displayed. The table name and description are required in order to create a new table. The new table is created after clicking on a 'Save The Table' button, and the new table will automatically be displayed as a new change request in a 'View Change Request' function 36.

The 'View Change Request' function 36 is used to view a change request for a business table and can be displayed by either selecting an existing change request hyperlink or clicking a 'New Change' button for a business table from the 'List Tables' function 30 or the 'View Table' function 32. Business makers have the ability to execute changes to a business table from the 'View Change Request' function as well as to submit, withdraw, or cancel change request, when all desired changes have been made. Business checkers have the ability to audit changes and approve or reject a submitted change request. All other user roles have only audit viewing privileges through the 'View Change Request' function 36. All functions to alter or update a business table can be executed from the 'View Change Request' function 36, including, for example, 'Add Rows' 48, 'Add Columns' 44 (text data tables only), 'Change Rows' 52, 'Delete Rows' 50, 'Change Columns' 46 (text data tables only), 'Modify Web Page List' 58, 'Change Table Description' 60, 'Preview a Web Page' 40, and 'Preview a Binary File' 42 (binary data tables only). Additionally, all functions related to a change request can be managed from the 'View Change Request' function 36, including, for example, 'Submit Change Request' 62, 'Cancel Change Request' 66, 'Withdraw Change Request' 64, and 'Review Change Request' 68.

The 'Add Columns' function 44 is used to add new column(s) to a business table (text data tables only) and can be displayed by selecting an 'Add Columns' hyperlink that is found on the first row of the last column of a business table in 'View Change Request' 36. The 'Add Columns' form is then displayed. A user can add up to five new columns for every add columns request, up to a maximum of 25 total columns in a business table. The ROW_ID column is automatically and permanently contained in each business table. ROW_ID's are used by business developers to query a specific data cell in a business table. The column name, description, and type are required for any new column. When all new column(s) have been completed, selecting a 'Save' button adds the new column(s) to the QA version of the table. After the checker approves the change request, the new column(s) are added to the production version of the table.

The 'Change Column' function 46 is used to change all cells in the column or to delete a column from a business table and can be executed by selecting a 'Change Column' hyperlink that is found on the last row of a business table for the column desired and permitted for change in 'View Change Request' function 36. The ROW_ID column values are automatically assigned and therefore cannot be changed. When updates to the column have been completed, selecting a 'Save' button updates the column in the QA version of the table. After the checker approves the change request, the column is updated in the production version of the table. To delete a column from a business table (text data tables only), the maker selects a 'Delete the Column' button. Upon verification of deletion through a pop-up box, the column is deleted from the QA version of the table. After the checker approves the change request, the column is deleted from the production version of the table. In binary data tables, LASTMODIFIED and LASTPUBLISHED columns cannot be changed. If a maker selects to change FILE column, a 'Browse' button is offered for each row for including a binary file from maker's local file system. The maker may perform multiple 'Change Column' functions and upload files. When all column(s) have been changed, selecting a 'Save' button saves the changed column(s) to the QA version of the table. After the checker approves the change request, the column is deleted from the production version of the table. When all column(s) have been changed, selecting a 'Save' button saves the changed column(s) to the QA version of the table. After the checker approves the change request, the changes are applied to the production version of the table.

The 'Add Rows' function 48 is used to add new row(s) to a business table and can be displayed by selecting an 'Add Rows' hyperlink that is found on the last row of the second column of a business table in 'View Change Request' function 36. An 'Add Rows' form is then displayed. The user may add up to five new rows for every add rows request up to a maximum of 50 rows in a business table. For binary data tables, in the FILE column, a 'Browse' button is offered for selecting a binary file from maker's local file systems to be included in a table row. When all new row(s) have been completed, selecting a 'Save' button will add the new row(s) to the QA version of the table. After the checker approves the change request, the new row(s) will be added to the production version of the table.

The 'Delete Row' function 50 is used to delete a row from a business table and can be executed by selecting a 'Delete Row' hyperlink that is found on the last column of a business table for the row desired for deletion in 'View Change Request' function 36. Upon confirmation of deletion through a pop-up box, the row is deleted from the QA version of the table. All ROW_ID column values below the deleted row will be changed so that ROW_ID values will remain sequential. After the checker approves the change request, the row is deleted from the production version of the table. The 'Change Row' function 52 is used to change a row in a business table and can be displayed by selecting a 'Change Row' hyperlink that is found on the first column of a business table for the row desired for modification in 'View Change Request' function 36. A 'Change Row' form is then displayed. For binary data tables, in the FILE column, a 'Browse' button is offered for selecting a binary file to replace an existing file in a table row.

When updates to the row have been completed, selecting a 'Save' button will update the row in the QA version of the table. After the checker approves the change request, the row will be updated in the production version of the table.

The 'Import Data' function 54 is used to change all rows in a business table (text data tables only) and can be displayed by selecting an 'Import Data' hyperlink that is found on the first column of a business table in 'View Change Request' function 36. A file selector pop-up window provides user with an ability to choose the directory and the file to be imported. Preferably, the selected file is in CSV (Comma Separated Value) format. The content of the CSV formatted files is easily manipulated, using Excel spread sheet or by other applications. One can use the 'Export Data' function 56 to obtain the CSV data formatted file. When the table updates have been completed, selecting a 'Save' button the QA version of the table is updated. After the checker approves the change request, the production version of the table is updated. The 'Export Data' function 56 is used to export the content of all rows in a business table (text data tables only) to a CSV data formatted file and can be displayed by selecting an 'Export Data' hyperlink that is found on the first column of a business table in 'View Change Request' 36. A new window with a file selector is displayed providing user with an ability to choose a directory where the file will be stored.

The 'Modify Web Page List' 58 function is used to modify the web page list for a business table and can be displayed by selecting a 'Modify Web Page List' hyperlink from 'View Change Request' function 36. A 'Modify Web Page List' form is then displayed. The user can modify, add, or delete page URL's that are associated with this business table. When updates to the web page list have been completed, selecting a 'Save' button updates the web page list in the QA version of the table. When reviewing a change request, a business checker can select the URL's found on the web page list to verify that the data from the business table is accurately represented on the desired page(s). After the checker approves the change request, the web page list is updated in the production version of the table.

The 'Change Table Description' function 60 is used to modify the table description and table production date for a business table and can be displayed by selecting a Change Description hyperlink from 'View Change Request' function 36. The user can modify the table description as desired. The production date for a table is only used for billing purposes. When updates to the table description and/or production date have been completed, selecting a 'Save' button updates the table description in the QA version of the table. After the checker approves the change request, the table description is updated in the production version of the table.

The 'Submit Change Request' function 62 is used to submit a change request for checker approval and can be executed from 'View Change Request' function 36. The user must select a checker from a 'Checker to Notify' list as well as the time and date when the changes will go to production. Changes associated with a change request can go to production immediately or at a specified time. If immediate change is desired, the user selects an 'Immediately After Checker Approval' radio button. If a specified time is desired, the user selects an 'At the Following Time . . . ' radio button. When selecting a specified time, the time selected for production is based on a business' local time. All date related fields for specifying a production time are required. Upon submission of the change request for checker approval, the change request status is changed from 'Saved' to 'Submitted', and a status email is sent to the selected checker.

The 'Withdraw Change Request' function 64 is used to withdraw a change request previously submitted for checker approval and can be executed by selecting a 'Withdraw Change Request' button from 'View Change Request' function 36. When a maker withdraws a 'Submitted for Checker Approval' change request, the change request status is changed from 'Submitted' to 'Saved', and a status email is sent to inform the selected checker that the change request has been withdrawn. The 'Cancel Change Request' function 66 is used to cancel a change request that has been saved. A business maker may want to cancel a change request to discard work in progress. 'Cancel Change Request' function 66 can be executed from 'View Change Request' function 36 by selecting a 'Cancel Change Request' button. Upon cancellation of the saved change request, the change request is discarded, and all changes associated with the change request are canceled.

The 'Review Change Request' function 68 is used to approve or reject a change request for a business table and can be executed from 'View Change Request' function 36. After reviewing the table data in the change request and viewing pages found on a 'Web Page List', the checker may either approve or reject the change request. If approved, the change request status is changed from 'Submitted' to 'Approved' and subsequently to 'Completed', when the change request goes into production. If rejected, the change request status is changed from 'Submitted' to 'Saved'. Upon completion of a change request review by the checker, a status email is sent to the business maker.

The 'Preview a Web Page' function 40 is used to preview table data changes from the web pages that display the table data and can be executed from 'View Table' function 32 or 'View Change Request' function 36. A list of web pages is added to the change request by the 'Modify web Page List' function 58. When a 'Web Page' link is clicked, a new 'Web Page Preview' window pops up. The 'Web Page Preview' window contains, for example, two frames aligned vertically. The upper frame contains a pull-down selection list including choices, for example, displaying the web page on the QA web server using the QA data, which for a 'Saved' or 'Submitted' change request, contain new changes in the database made by a maker that have not yet been approved by a checker; displaying the web page on the QA web server using the QA data; displaying the web page on the QA web server using the production data, which contains checker approved data in the database; or displaying the web page on the Production web Server using the production data. Based on the user's choice, a web page content is displayed at the lower frame for preview. Checkers can use this function to preview data changes before approving a 'Submitted' change request.

The 'Preview a Binary File' function 42 is used to preview binary data files and can be executed from 'View Table' function 32 or 'View Change Request' function 36 (binary data table only). When a user clicks the link on a binary data file in the FILE column, a pop-up window will display its content. Checkers can likewise use this function to preview new or changed binary data before approving a 'Submitted' change request. The 'Delete Table' function 38 is used to delete a table from the list of business tables and can be execute from 'List Tables' function 30. The business table is then deleted from the QA version of the WDIU database and is also deleted from the production versions of the WDIU database after the checker approves the change request.

Security aspects of the WDIU system for embodiments of the invention include, for example, providing secure transmission and storage of data and controlled access to the databases. Secure transmission between customers and the production web servers 12 and between business users and the development/QA web servers 18 is provided using Secure Sockets Layer (SSL), and secure transmission between web servers 12, 18 and the database servers 14, 16 is provided using secure JDBC. In addition, the QA database server 16 and development web servers 18 are behind a firewall. Changes to the production version of the business data table are replicated from the QA database server 16 to the production database servers 14 using secure DB replication. Further, access to the QA database 16 by business users is controlled by user IDs and passwords, and business users can change their password via the web browser of the business user's workstation 20.

In order to assure continuity of business for embodiments of the invention, preferably there are at least two WDIU production database servers 14 located in geographically diverse data centers. Each WDIU production database server 14 contains a snapshot of a WDIU system table PUBLISH_SCHED on the WDIU QA database server 18. When changes to the database table are ready to go to production, PUBLISH_SCHED is updated by the WDIU backend database management application on the WDIU QA database server 16. Subsequently, this update is applied to the table's snapshot on the WDIU production database servers 14. The latter updates trigger a stored procedure on each WDIU production database server 14 to copy specified business data table changes from the WDIU QA database server 16. Therefore, all WDIU production database servers 14 have the same changes at approximately the same time. The WDIU front-end database access application on the production web servers 12 attempts to connect to the database server 14 that was successfully connected last time or a default primary WDIU production database server. If the connection fails, the WDIU front-end database access application attempts another WDIU production database server in the available database server list.

Also in order to assure continuity of business, preferably, there are two WDIU QA database servers 16 in hot standby mode located in a data center. Data access and data changes is performed on the primary WDIU QA database server 16. All changes are replicated automatically to the standby server. When the primary instance is down, the system administrator can manually activate the standby instance and change service name in the database link in each of the WDIU production database instances. The WDIU data access application on the development/QA web servers 18 automatically switches JDBC connection from primary to the standby instance.

Each production database server 14 has a database link to the QA database server 16. This link is used for publishing business data table changes from QA to production and for snapshots between these two servers. Each production database server 14 contains two table snapshots for tables PUBLISH_SCHED and USER_INFO in the QA database server 16. The PUBLISH_SCHED snapshot replicates the entire table data every minute. Any new rows in the table or any updated rows that have JOBSTATUS column value being "Completed" trigger a change request publishing stored procedure in the production database server 14 to perform table data copy functions for relevant tables or rows from the QA database server 16 to the production database server 14. The USER_INFO snapshot replicates the rows with column ROLE equaling 'System Administrator'. With this snapshot, system error can be reported to system administrators by e-mail.

The WDIU backend database management application for embodiments of the invention enables business users and system administrators to perform data updates in the production database via web browsers. It consists of WDIUAPP JAVA servlet with supporting JAVA classes and XSL files that reside on the development/QA web server 18 and stored procedures on the QA database servers 16. The request from a web browser to the WDIU backend database management application is always handled by the WDIUAPP servlet first. The servlet may call various supporting JAVA classes to process the request and then returns the response in HTML format to the browser. The user can then select a link or fill in a form in the response screen to issue another request to the WDIUAPP servlet. The supporting JAVA classes called by the WDIUAPP servlet contain code to establish connections to the QA database servers 16 and to read and write WDIU system tables and WDIU business data tables in the QA database servers 16.

When a business administrator or a system administrator creates a new user account, a user ID and a temporary password are assigned to the new user. In addition, a role, such as business administrator, checker, maker, reader, or system administrator, is assigned to the user. Users' account information is stored in the USER_INFO system table. To access the WDIU backend database management application, users are required to enter their user ID and password on the logon page. When the user ID and password are submitted, the WDIUAPP servlet checks the user ID and password combination against the USER_INFO system table. If the logon is successful, the WDIUAPP servlet establishes a WDIU session on the servlet engine of the development/QA web servers 18. Certain key properties called session variables, e.g. user ID, are associated with each WDIU session in the memory of the servlet engine. The session ID, a long random string created at the session creation time, is passed to the user's browser as a browser cookie. This session ID will be referenced when the WDIUAPP servlet receives subsequent requests from the user's web browser. Therefore, the user can perform multiple database queries and/or updates without further authentication challenges. User authorization is implemented around the user roles. Before committing any database change, a role check is conducted to make sure that the user has the authority to perform the change. In general, all users can read the database tables. User accounts can be updated by the same business administrator. A maker can update business data tables of his/hers business. A checker can approve or reject business data table changes for his/hers business. A system administrator can perform all functions that other users can, and, in addition, he or she can create or update business information.

The parameters passed between the WDIUAPP servlet and its supporting classes and between supporting classes are in XML format. In order to return HTML in the servlet response, the WDIUAPP servlet calls the XSLT processor to convert XMLs returned by supporting classes to HTMLs, using XSL files. The XSL files are part of the WDIU backend database management application. Every WDIU browser screen is associated with an XSL file. More than one browser screen can share the same XSL file if they have the same format. Business data on WDIU browser screens is in general contained in XML produced by JAVA classes. XSL files define the data formatting and screen layout. Because data passing is via XML, any input data that contains special characters that may break the well-formedness of XML or may be ignored in XML need special handling. Such characters include "&", "<", the double quote symbol, and the line break symbol. The WDIU backend database management application will replace these characters by designated strings of XML-safe characters. The WDIU backend and front end applications apply reverse transformations should these characters be included in the output of the applications.

The WDIUAPP servlet and its supporting JAVA classes make JDBC connections to the QA database servers 16. The data transferred between a development/QA web server 18 and the QA database server 16 are encrypted using RC128-bit encryption. When establishing a first connection, the WDIUAPP servlet and its supporting JAVA classes determine availability of the primary and backup QA database servers. All subsequent sessions connect to the same QA database server as the initial one. When one of the connections to a designated QA database server 16 fails and the connection to the alternate QA database server is successful, all existing sessions will automatically connect to the newly designated QA database server.

Database stored procedures running on the QA database servers 16 and/or production database servers 14 include, for example, PUBLISH_CR, SEND_EMAIL, and INACTIVITY_CHK. The PUBLISH_CR stored procedure runs on the QA database servers 16 and production database servers 14 and is invoked by the trigger PUBLISH_SCHED_QA_TRIG on the QA database servers 16 or the trigger PUBLISH_SCHED_PROD_TRIG on the production database servers 14. On the QA database server 16, the stored procedure saves a copy of the pre-approved version (i.e., the maker's version) of the specified business data table to the same server. This copy is an image of the table in the production database server 14. The WDIU backend application uses this copy to compare with future maker's version of the table and identifies the new changes.

On the production database server 14, the stored procedure copies the specified business data table from the QA database server 16 to the current production server 14. Thus, it completes the change request publishing tasks. The above mentioned specified business data table, its business name, table name, change request number, and changeable units affected, are obtained from the new or updated row of the PUBLISH_SCHED table (or its snapshot). If the changeable units contain only individual row numbers, the content of these rows are copied. Otherwise, the entire table is copied. When the data copying is completed on the QA database server 16, the JOBSTATUS column of the relevant row in the PUBLISH_SCHED table is changed to "Completed".

A SEND_EMAIL stored procedure runs on the QA database servers 16 and WDIU production database servers 14. When invoked, it sends e-mail with the subject "WDIU DB Alert from (server name)" to the system administrators' e-mail and alert e-mail addresses for reporting abnormal system errors. The INACTIVITY_CHK stored procedure runs daily on the QA database servers 16 and performs user account maintenance. It deletes any user account that has more than a pre-determined number of days of inactivity. It also locks any user account that has more than a certain number of days but less than the pre-determined number of days of inactivity. A user's inactivity period is defined as the time period within which the user has not successfully logged on to the WDIU backend database management application.

A PUBLISH_SCHED_QA_TRIG database trigger runs on the QA database server 16, and a PUBLISH_SCHED_PROD_TRIP database trigger runs on the production database server 14. The PUBLISH_SCHED_QA_TRIG running on the QA database servers 16 is invoked when the system table PUBLISH_SCHED has a new or updated row and its JOBSTATUS column has value 'Pending'. The update of the PUBLISH_SCHED table is controlled by the WDIU backend application. The above condition is satisfied when a change request is just approved by a checker or when a failed change request publish job is restarted manually. The trigger simply schedules an ORACLE job to run PUBLISH_CR at the time when the relevant change request should be published to the production. This time can be immediate or in the future. The maker specifies this time when he or she submits the change request.

A PUBLISH_SCHED_PROD_TRIP running on the production database servers 14 is invoked when the system table PUBLISH_SCHED has a new or updated row and its JOB-STATUS column has value 'Completed'. The above condition is satisfied when a change request is just approved by a checker and it is published successfully on the QA database server 16 as the result of running the PUBLISH_CR stored procedure or when an out-of-service production database server is just brought back to service and multiple pending publish jobs show up at the PUBLISH_SCHED snapshot. The trigger simply schedules an ORACLE job to run PUBLISH_CR at the time when the relevant change request should be published to the production.

In order to allow makers to change multiple rows of the text data table at the same time and/or manage the text data table using the Excel spreadsheet, the table data import and export functions are introduced. The import file format is preferably Comma Separated Value (CSV) format. This format can be imported to or exported from Microsoft Excel. It is also much more efficient and convenient than other formats such as XML. In order to conveniently obtain a CSV file from an existing WDIU business data table, the data export function is implemented using JAVA servlet. When invoked, the data export function calls the ORACLE XML utility to save the table data to an XML format. Thereafter, the JAVA code extracts data from XML to convert the data to CSV format. As part of the standard approach in CSV, columns are separated by commas, and rows are separated by line breaks. If a cell value contains a comma, the entire cell value is enclosed in double quotes ("). If a cell value contains a double quote, all double quotes are replaced by two double quotes ("") and the entire cell value is enclosed in double quotes. The file download is accomplished technically in the servlet by setting HTTP servlet response's content-disposition field to attachment; filename="default file name". The CSV file can be opened in Microsoft Excel. The import function reverses export. A modified Excel file (all cells are in a text format) can be saved to a CSV file. A third party JAVA servlet library is used to handle the file upload from the web browser. Upon receiving the file, the JAVA application converts it to the XML format required by the ORACLE XML utility, and the utility is then used to replace the ORACLE table.

Dynamic content from the production database can be accessed using WDIU custom tags that are developed using the JAVA JSP tag API. WDIU custom tags perform the various functions, such as checking if the business data table text content has already cached in the JSP Page Context as an XML DOM object, establishing a connection to the production database 14, or if the connection fails, to another production database server in the available server list, checking if the business data table type (TEXT or BINARY) has been determined and cached in the JSP Session Context, and creating and executing an SQL query to the production database 14 and obtaining the business data table type. Other functions performed by the WDIU custom tags include, for example, creating and executing a SQL query according to the tag parameters to the production database 14 to obtain text columns of the business data table, caching the query result in an XML DOM object to the JSP Page Context, or if the table type is BINARY, checking the binary data file in the binary file temporary directory of the web server 12 where JSP is executed, and returning a string result according to the JSP parameters by retrieving data from the XML DOM object.

The wdiu_data tag queries the database for a cell value (text only) in the specified column and row of the table. The result will be placed in the location of the tag when the JSP page is returned to the web browser. The wdiu_data Tag adheres to the following syntax:

```
<wdiu:wdiu_data business="{business name}" table="{table name}"
column="{column name}" row="{row value}" unavailable="{unavailable
message}" cache="{cache level}" />
```

The business and table attributes identify a business table in the WDIU database 14. The column attribute specifies the column from which the data item is to be retrieved. The row attribute is used to select the row from which the data item will be retrieved. If any failures occur or resulting SQL statement is flawed or returns no value, the string defined in the unavailable attribute is returned to the screen. The cache attribute enables JSP page to cache the result of the SQL query, therefore, minimizing trips to the WDIU production database 14, when a page contains more than one WDIU custom tag.

Depending on the intended display content of the page, appropriate cache attributes can be set ("table", "column", or "row"). The cache attribute is optional. By not setting the cache attribute every WDIU custom tag in a JSP page invokes a query to the WDIU production database 14. When the cache attribute is selected, after retrieval of the query result set and conversion to XML, the XML DOM object is placed in the page context object of the JSP. Subsequent queries using WDIU custom tags on the JSP then look first at the XML DOM object for query results before going to the WDIU production database 14. For queries to the binary data tables, if the column name is "DESC1" or "DESC2" and its value contains the meta form "% file %", this meta form will be replaced by an HTML hyperlink that links to the corresponding binary data file in the WDIU binary file temporary directory of the web server 12.

The wdiu_var tag queries the WDIU database 14 in the same way as wdiu_data tag. The result is placed in the specified local variable which can be referenced using embedded JAVA code (i.e., inside <% %> tags) in the JSP beneath the wdiu_var tag. An empty string is placed in the location of the tag when the JSP page is returned to the web browser.

```
<wdiu:wdiu_var var="{variable name}" business="{business name}"
table="{table name}" column="{column name}" row="{row value}"
unavailable="{unavailable message}" cache="{cache level}" />
```

The "var" attribute is unique to the wdiu_var tag and specifies the name of the local variable. After querying the specified data element (based on table, column, and row), the resulting sting is assigned to the local variable named in the "var" attribute.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method for updating web pages on a web server without republishing the web pages, comprising:
   generating in a quality assurance database server by a backend database management application a live version of at least one business data table containing business information that is used to populate web pages on a production web server and a quality assurance version of said at least one business data table containing said business information that is used to populate web pages on a quality assurance web server;
   replicating by the backend database management application the live version of said at least one business data table via a database link from the quality assurance database server to a production database server;
   receiving entry on the quality assurance database server via a business workstation coupled to the quality assurance database server of a change to time-critical data on the quality assurance version of said at least one business data table and a designation of a time for the change to the time-critical data to be replicated from the quality assurance database server to the live version of said at least one business data table on the production database server;
   replicating by the backend database management application the change to the time-critical data on the quality assurance version of said at least one business data table at the designated time from the quality assurance database server to the live version of said at least one business data table on the production database server; and
   providing access via browsers on all customers' workstations, equally without apportioning or allocating said access among said customers, to the live version of said at least one business data table by the production database server immediately upon replicating by the backend database management application the change to the time-critical data on the quality assurance version of said at least one business data table at the designated time from the quality assurance database server to the live version of said at least one business data table on the production database server.

2. The method of claim 1, wherein the quality assurance web server is accessible via a browser on the business workstation.

3. The method of claim 1, wherein the respective versions of the at least one business data table further comprise a text data table.

4. The method of claim 1, wherein the respective versions of the at least one business data table further comprise a binary data table.

5. The method of claim 1, wherein each of the database servers further comprises an SQL database.

6. The method of claim 1, wherein receiving entry of the change to the data on the quality assurance version further comprises receiving entry on the quality assurance database server of a change adding or deleting a business data table.

7. The method of claim 1, wherein receiving entry of the change to the time-critical data on the quality assurance version and the designation of the later time for the change to be replicated further comprises receiving entry on the quality assurance database server of a change adding or deleting at least one row to the business data table.

8. The method of claim 1, wherein receiving entry of the change to the time-critical data on the quality assurance version and the designation of the later time for the change to be replicated further comprises receiving entry on the quality assurance database server of a change adding or deleting at least one column to the business data table.

9. The method of claim 1, wherein receiving entry of the change to the time-critical data on the quality assurance version and the designation of the later time for the change to be replicated further comprises receiving entry on the quality assurance database server of a change modifying content of at least one row or column of the business data table.

10. The method of claim 1, further comprising granting access to a checker via a web browser at the business workstation to the quality assurance database server to review the change to the time-critical data on the quality assurance version of the business data table.

11. The method of claim 10, wherein granting access to the checker via a web browser at the business workstation further comprises displaying for the checker at the business workstation a web page populated by said at least one business data table in which the time-critical data is changed.

12. The method of claim 1, wherein the database link further comprises a global network.

13. The method of claim 1, wherein the database link further comprises an intranet.

14. A computer system for updating web pages on a web server without republishing the web pages, comprising:
   a backend database application that generates in a quality assurance database server a live version of at least one business data table containing business information that is used to populate web pages on a production web server and a quality assurance version of said at least one business data table containing said business information that is used to populate web pages on a quality assurance web server and that replicates the live version of said at least one business data table via a database link from the quality assurance database server to a production database server;
   the quality assurance database server being preprogrammed to receive entry via a business workstation coupled to the quality assurance database server of a change to time-critical data on the quality assurance version of said at least one business data table and a designation of a time for the change to the time-critical data to be replicated from the quality assurance database server to the live version of said at least one business data table on the production database server;
   the backend database management application being preprogrammed to replicate the change to the time-critical data on the quality assurance version of said at least one business data table at the designated time from the quality assurance database server to the live version of said at least one business data table stored on the production database server; and
   the production database server being preprogrammed to provide access via browsers on all customers' workstations, equally without apportioning or allocating said access among said customers, to the live version of said at least one business data table immediately upon replicating by the backend database management application the change to the time-critical data on the quality assurance version of said at least one business data table at the designated time from the quality assurance database server to the live version of said at least one business data table on the production database server.

* * * * *